(12) United States Patent
Diana et al.

(10) Patent No.: US 12,099,286 B2
(45) Date of Patent: Sep. 24, 2024

(54) PROJECTION DISPLAY SYSTEM AND METHOD

(71) Applicant: Lumileds LLC, San Jose, CA (US)

(72) Inventors: Frederic Stephane Diana, Santa Clara, CA (US); Nicola Bettina Pfeffer, Eindhoven (NL); Arjen Gerben Van der Sijde, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 353 days.

(21) Appl. No.: 17/496,424

(22) Filed: Oct. 7, 2021

(65) Prior Publication Data
US 2022/0113613 A1    Apr. 14, 2022

Related U.S. Application Data

(60) Provisional application No. 63/089,867, filed on Oct. 9, 2020.

(51) Int. Cl.
| | |
|---|---|
| *G03B 21/20* | (2006.01) |
| *G02B 27/14* | (2006.01) |
| *G02B 27/28* | (2006.01) |

(52) U.S. Cl.
CPC ....... *G03B 21/2033* (2013.01); *G02B 27/149* (2013.01); *G02B 27/283* (2013.01); *G02B 27/286* (2013.01); *G03B 21/2073* (2013.01); *G03B 21/208* (2013.01)

(58) Field of Classification Search
CPC ............ G03B 21/2033; G03B 21/2073; G03B 21/208; G02B 27/149; G02B 27/283; G02B 27/286

USPC .......................................................... 353/20
See application file for complete search history.

(56) References Cited

FOREIGN PATENT DOCUMENTS

| | | | | |
|---|---|---|---|---|
| JP | 106662753 | A | * | 5/2017 |
| RU | 2381625 | C1 | * | 2/2010 |
| RU | 2563908 | C1 | * | 9/2015 |

OTHER PUBLICATIONS

Translation of RU 2563908 (Year: 2023).*
Translation of RU 2381625 (Year: 2023).*
Translation of CN106662753 (Year: 2023).*

* cited by examiner

*Primary Examiner* — Jerry L Brooks
(74) *Attorney, Agent, or Firm* — Schwegman, Lundberg & Woessner, P.A.

(57) ABSTRACT

In a projection display system, a polarizing beamsplitter can split an unpolarized light beam into a first internal beam and a second internal beam, which can have polarization states that are orthogonal. A polarization rotator, such as a half-wave plate, can rotate a plane of polarization of at least one of the first internal beam or the second internal beam. A beam aligner, such as a second polarizing beamsplitter, can change a propagation direction of at least one of the first internal beam or the second internal beam. The polarization rotator and the beam aligner each can adjust at least one of the first or second internal beams such that the first internal beam forms a first exiting beam and the second internal beam forms a second exiting beam. The first exiting beam and the second exiting beam can be adjacent and parallel and have parallel polarization states.

17 Claims, 4 Drawing Sheets

PROJECTION DISPLAY SYSTEM AND METHOD

CROSS-REFERENCE TO RELATED APPLICATION

This application claims the benefit of U.S. Provisional Application No. 63/089,867, filed Oct. 9, 2020, which is hereby incorporated by reference in its entirety.

FIELD OF THE DISCLOSURE

The present disclosure relates generally to projection devices that use light-emitting diodes (LEDs).

BACKGROUND OF THE DISCLOSURE

LEDs are used as light sources in projectors. There is ongoing effort to make LED-based projection devices more efficient.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

A typical projection display system can direct light from an unpolarized LED through a first polarizer to form polarized light, to a panel that can controllably rotate a plane of polarization for each area (e.g., pixel) on the panel to form polarization-modulated light, and through a second polarizer, which passes intensity-modulated light having an intensity that varies as a function of the polarization rotation for each pixel. A source of inefficiency for the typical projection display system is the passing of the unpolarized light through the first polarizer, which discards 50% of the optical power.

The projection display system described in detail below can split the unpolarized light into two components, can alter the polarization state of one or both such that the polarization states are parallel, and can align the two components to be adjacent and parallel. Such alignment can effectively form one beam of a single polarization state, which can be used to illuminate a display panel, such as a liquid crystal display (LCD) panel. Because the projection display system can use both polarization states from the unpolarized light, rather than just one of the two polarization states, the projection display system can effectively increase its efficiency by a factor of two compared to the typical projection display system.

Figure 1:
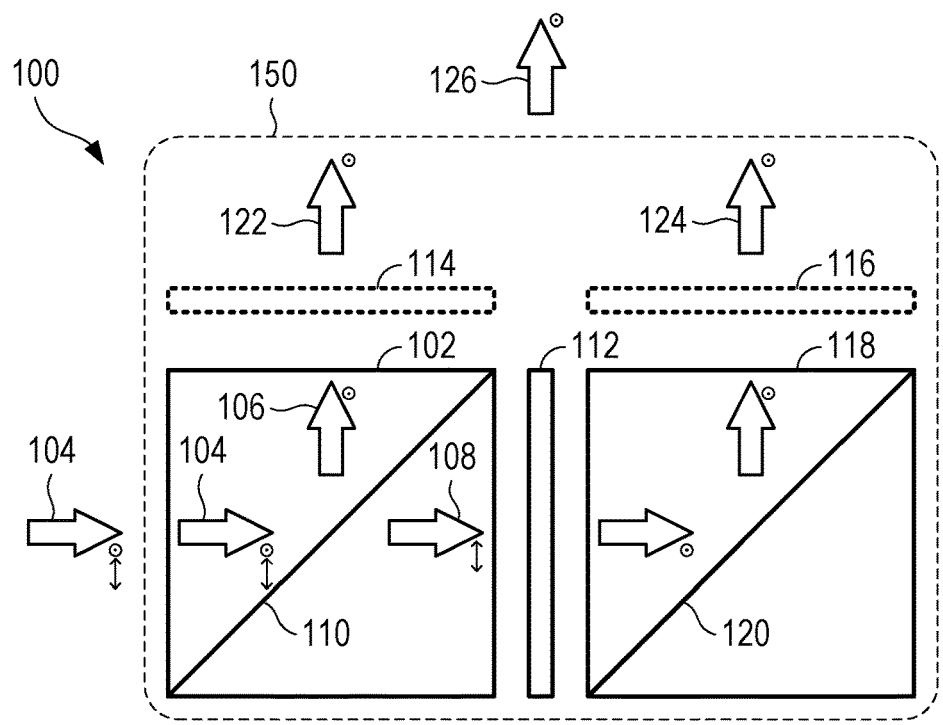
FIG. 1 shows a side view of an example of a portion of a projection display system, in accordance with some examples.

FIG. 1 shows a side view of an example of a portion of a projection display system 100, in accordance with some examples. A complete system, as described below with regard to FIG. 2, can integrate the elements of FIG. 1 with additional optical and electrical components that can produce light, modulate light, and electrically control elements in the system. The portion of the projection display system 100 shown FIG. 1 is but one example of such a portion; other configurations can also be used.

The projection display system 100 can include a polarizing beamsplitter 102. The polarizing beamsplitter 102 can split an unpolarized light beam 104 into a first internal beam 106 and a second internal beam 108. The first internal beam 106 and the second internal beam 108 can have polarization states that are orthogonal. The first internal beam 106 and the second internal beam 108 can propagate along different directions. In the configuration of FIG. 1, the first internal beam 106 can reflect from the polarizing beamsplitter 102 and can have a polarization state that is orthogonal to a plane of the page of FIG. 1. With regard to a reflecting element of the polarizing beamsplitter 102, such as a hypotenuse 110, the polarization state of the first internal beam 106 can be referred to as s-polarized light. In the configuration of FIG. 1, the second internal beam 108 can transmit through the polarizing beamsplitter 102 and can have a polarization state that lies within the plane of the page of FIG. 1. With regard to the reflecting element of the polarizing beamsplitter, such as the hypotenuse 110, the polarization state of the second internal beam 108 can be referred to as p-polarized light. As an alternative, the first internal beam 106 can have p-polarized light, and the second internal beam 108 can have s-polarized light. As a further alternative, both the first internal beam 106 and the second internal beam 108 can have polarization states that are angled with respect to purely s-polarized light and purely p-polarized light (e.g., both can be combinations of s- and p-polarizations), and are optionally orthogonal to each other. In the configuration of FIG. 1, the reflecting element can be a hypotenuse 110 oriented at 45 degrees with respect to an incident beam direction. As an alternative, the reflecting element can be any suitable reflecting surface, oriented at any suitable orientation on or in the polarizing beamsplitter 102.

In the configuration of FIG. 1, the polarizing beamsplitter 102 can include a cube beamsplitter having a beamsplitting (e.g., polarization-sensitive) coating on a hypotenuse 110 of the cube beamsplitter. The cube beamsplitter can direct the first internal beam 106 and the second internal beam 108 in orthogonal directions. In some examples, the beamsplitting coating can be highly reflective (for example, with a reflectivity greater than or equal to 90%) for s-polarized light. In some examples, the beamsplitting coating can be highly transmissive (for example, with a transmissivity greater than or equal to 90%) for p-polarized light. In some examples, the beamsplitting coating can have a spectral width that is greater than or equal to a spectral width of the unpolarized light beam 104. In some examples, because unpolarized light can have equal or substantially equal amounts of p-polarized and s-polarized light, the first internal beam 106 and the second internal beam 108 can have equal, or substantially equal, intensities or optical powers (neglecting losses from surface reflections and coating inefficiencies). As an alternative to a cube beamsplitter (or a beamsplitter having a rectangular profile), the polarizing beamsplitter 102 can be formed as a plate beamsplitter, having a polarization-sensitive coating on one or both faces of the plate beamsplitter. Other suitable beamsplitter configurations can also be used.

The projection display system 100 can include a polarization rotator 112. The polarization rotator 112 can rotate a plane of polarization of at least one of the first internal beam 106 or the second internal beam 108. In the configuration shown in FIG. 1, the polarization rotator 112 can rotate a plane of polarization of the second internal beam 108 by 90 degrees from p-polarization to s-polarization. In other configurations, the polarization rotator 112 can be positioned and oriented to rotate a plane of polarization of the first internal beam 106 by 90 degrees from s-polarization to p-polarization. In some configurations, the polarization rotator 112 can include more than one polarization-rotating element, which can adjust polarization states of the first internal beam 106 and/or the second internal beam 108. In some examples, the polarization rotator 112 can include a half-wave plate 114 located in the optical path of the first internal beam 106. For these examples, the half-wave plate 114 can be oriented such that a fast axis of the half-wave plate 114 is angled by 45 degrees with respect to a polarization orientation of the first internal beam 106, such as to convert s-polarized light to p-polarized light. In some examples, the polarization rotator 112 can include a half-wave plate 112 or 116 located in the optical path of the second internal beam 108. In these examples, the half-wave plate 112 or 116 can be oriented such that a fast axis of the half-wave plate 112 or 116 is angled by 45 degrees with respect to a polarization orientation of the second internal beam 108, such as to convert p-polarized light to s-polarized light.

The projection display system can include a beam aligner 118. The beam aligner 118 can change a propagation direction of at least one of the first internal beam 106 or the second internal beam 108. In some examples, the beam aligner 118 can include a mirror 120 that can reflect one of the first internal beam 106 or the second internal beam 108 to be parallel to the other of the first internal beam 106 or the second internal beam 108. In the configuration of FIG. 1, the beam aligner 118 can reflect the second internal beam 108 to be parallel or substantially parallel to the first internal beam 106. In other configurations, the beam aligner 118 can reflect the first internal beam 106 to be parallel or substantially parallel to the second internal beam 108. In still other configurations, the beam aligner 118 can change propagation directions of both the first internal beam 106 and the second internal beam 108 to be parallel or substantially parallel.

In the configuration of FIG. 1, the cube beamsplitter can be a first cube beamsplitter, and the mirror 120 can include a hypotenuse of a second cube beamsplitter located adjacent to the first cube beamsplitter. In the configuration of FIG. 1, the polarization rotator 112, or at least one polarization-rotating element of the polarization rotator 112, can be located between the first cube beamsplitter and the second cube beamsplitter. In other configurations, the first cube beamsplitter and the second cube beamsplitter can be directly adjacent, with no intervening optical elements disposed between the first cube beamsplitter and the second cube beamsplitter. In some examples, the second cube beamsplitter can have a coating on the hypotenuse that is similar in structure and function to the coating on the hypotenuse 110 of the first cube beamsplitter. In other configurations, the second cube beamsplitter can be replaced with a plate beamsplitter, optionally with a high-reflectivity coating on one or both sides of the plate beamsplitter.

The polarization rotator 112 and the beam aligner 118 can each adjust at least one of the first internal beam 106 or the second internal beam 108 such that the first internal beam 106 forms a first exiting beam 122 and the second internal beam 108 forms a second exiting beam 124. The first exiting beam 122 and the second exiting beam 124 can be adjacent and parallel and can have polarization states that are parallel.

Because the first exiting beam 122 and the second exiting beam 124 can be adjacent and parallel, and can have polarization states that are parallel, the first exiting beam 122 and the second exiting beam 124 can form a single exiting beam 126. The single exiting beam 126 can be used to illuminate a display panel, as described below.

In order to form a suitable single exiting beam 126, the first exiting beam 122 and the second exiting beam 124 can be positioned to be directly adjacent, with respective beam edges that nearly overlap or overlap slightly. The first exiting beam 122 can be centered around a first beam center and can have a first beam diameter. The second exiting beam 124 can be centered around a second beam center and can have a second beam diameter. The first beam diameter can be roughly equal to the second beam diameter. For example, the first beam diameter can be between 90% and 110% of the second beam diameter, between 95% and 105% of the second beam diameter, between 98% and 102% of the second beam diameter, or can have another suitable value. The first beam center and the second beam center can be separated by roughly the first beam diameter or roughly the second beam diameter. For example, the first beam center and the second beam center are separated by a value between 90% and 110% of the second beam diameter, between 95% and 105% of the second beam diameter, between 98% and 102% of the second beam diameter, or by another suitable value.

For the discussion that follows, the optical elements shown in FIG. 1, including the polarizing beamsplitter 102, the polarization rotator 112, and the beam aligner 118, can be grouped together as a module 150. The module 150 can receive the unpolarized light beam 104 and can output the single exiting beam 126.

Figure 2:
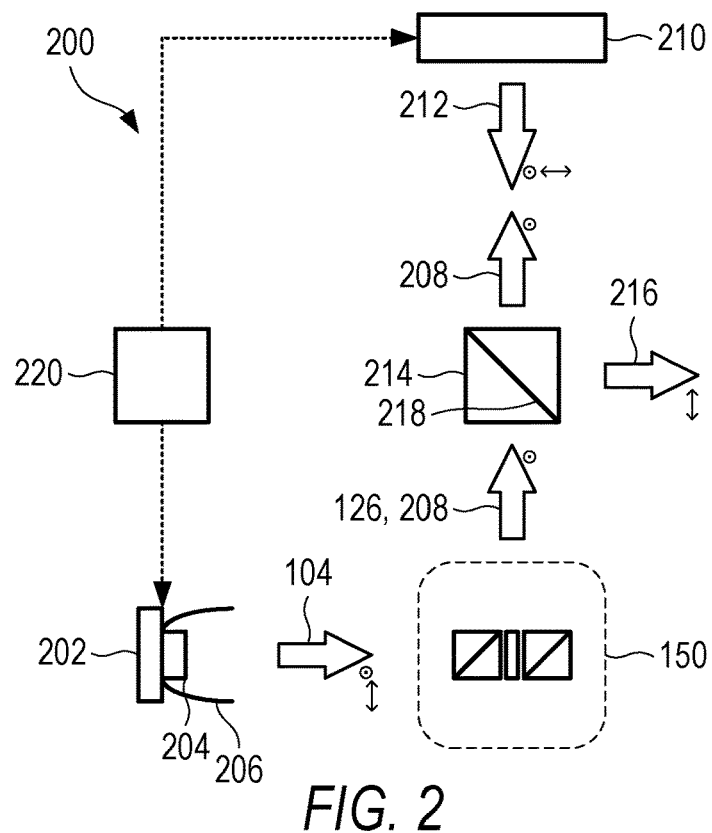
FIG. 2 shows a side view of an example of a projection display system, in accordance with some examples.

FIG. 2 shows a side view of an example of a projection display system 200, in accordance with some examples. The projection display system 200 can include the module 150, including any or all of the various configurations described above regarding FIG. 1.

The projection display system 200 can include a light source 202.

The light source 202 can include at least one light-emitting diode 204 that can emit light. In some examples, the light source 202 can be an extended light source, which can emit light over an emission area that is typically significantly larger than a wavelength of the emitted light. For example, a light-emitting diode can emit light having a wavelength smaller than 1 μm and can have an emission area that can be 1 mm on a side, or larger. In contrast, light sources that are not extended light sources can emit light from a point source, or from an area or a virtual area that is sized on the order of the wavelength, such as a laser diode, or a single-mode fiber. In some examples, the light source 202 can include an array of light-emitting diodes 204. The array of light-emitting diodes 204 can optionally be disposed on a single substrate. In other examples, the light-emitting diodes 204 can be disposed on different, independent substrates, on which the light-emitting diodes 204 are formed. In some examples, each light-emitting diode 204 in the array can be controlled independently of the other light-emitting diodes 204 in the array. For example, a light-emitting diode 204 can receive a specified current, and in response, can emit light from an emission surface of the light-emitting diode 204. The emission surface can extend over an emission area. The emission from each location in the emission area can have a Lambertian angular profile (e.g., can vary cosinusoidally as a function of emission angle, with respect to a surface normal of the emission area). The emission can be uniform or substantially uniform from location-to-location across the emission area of an individual light-emitting diode 204 of the array of light-emitting diodes 204. In some examples, the array of light-emitting diodes 204 can be an array of white light-emitting diodes 204. For example, the array of white light-emitting diodes 204 can produce excitation light having an excitation wavelength, which can optionally be in a blue or violet portion of the visible spectrum and can include a phosphor that can absorb some or all of the excitation light and can emit phosphor light at wavelengths that are longer than the excitation wavelength. Other light sources can also be used.

The light source 202 can include a collimator 206 that can collimate the light from the at least one light-emitting diode 204 to form the unpolarized light beam 104. In some examples, the collimator 206 can include a reflector that is shaped to collimate light from the at least one light-emitting diode 204. For example, the reflector can have a cross-section that is parabolic, for a cross-section that includes a longitudinal emission axis of the at least one light-emitting diode 204. In some examples, the reflector can include a reflective surface that at least partially surrounds an open interior volume. In some examples, the reflector can include a surface that reflects via total internal reflection, the surface at least partially surrounding a solid interior volume. In some examples, the reflector can include a reflective material disposed on a surface that reflects via total internal reflection, the surface at least partially surrounding a solid interior volume. In some examples, the reflector can include a lens that can collimate light from the at least one light-emitting diode 204. The lens can have a focal plane and can be positioned such that the focal plane coincides or nearly coincides with the at least one light-emitting diode 204. The lens can focus the light via refraction at one or more lens surfaces. The lens can optionally include one or more surfaces that can redirect light inside the lens via total internal reflection from one or more surfaces of the lens. Other collimator configurations can also be used.

As explained above, the first exiting beam 122 (FIG. 1) and the second exiting beam 124 (FIG. 1) can form the single exiting beam 126. In some examples, the single exiting beam 126 can be an unmodulated beam 208.

To modulate the unmodulated beam 208, the projection display system 200 can include a polarization-modulating panel 210, such as liquid crystal display panel. The polarization-modulating panel 210 can include an array of pixels. Each pixel can modulate a polarization state of a corresponding portion of the unmodulated beam 208 to form a polarization-modulated beam 212. For example, the pixels can correspond to individual areas of a video or static image. The amount of modulation can vary for a video image or can remain constant or nearly constant over time for a static image. The amount of modulation can correspond to an intensity or a brightness value for each pixel. In some examples, the unmodulated beam 208 can illuminate the polarization-modulating panel 210 with light having a first polarization state. The modulation included in the polarization-modulated beam 212 can include a second polarization state that is orthogonal to the first polarization state, where the amount of light in the second polarization state for each pixel can correspond to the intensity or a brightness value for the pixel.

The projection display system 200 can include a polarizer 214 that can convert the polarization-modulated beam 212 to an intensity-modulated beam 216. In the configuration of FIG. 2, the polarizer 214 can include a cube beamsplitter, with a polarization-sensitive coating on a hypotenuse 218 of the cube beamsplitter. Other geometries and configurations can also be used.

The projection display system 200 can direct the intensity-modulated beam 216 to a screen, a viewport, or optional projection optical elements that can direct the intensity-modulated beam 216 to a suitable screen or viewport.

The projection display system 200 can include a controller 220 that can cause an electrical circuit to power the light source 202 and can supply a video signal and/or static image signal to the polarization-modulating panel 210. In some examples, the controller 220 can selectively power light-emitting diodes of the light source 202, where the light-emitting diodes of an array can be individually addressable. For example, the controller 220 can specify which light-emitting diodes of the array are electrically powered, how much current is to be delivered to each light-emitting diode, and how such quantities evolve over time. The light source 202 can optionally include multiple sets of LEDs driven by an LED driver that is controlled by the controller 220, such as a microprocessor. In some examples, the controller can be coupled to an input video signal, which can be generated from a file stored on a server (not shown), or from a camera and sensors (not shown). The controller 220 can operate in accordance with instructions and profiles stored in a memory. In some examples, the system 200 can include modules that allow wirelessly communicating via Bluetooth, Wi-Fi, LTE, or any other communication protocol using RF transceiver circuitry. In some examples, the system may lack the RF transceiver circuitry or otherwise lack the ability to wirelessly communicate with other electronic devices using a communication protocol.

Figure 3:
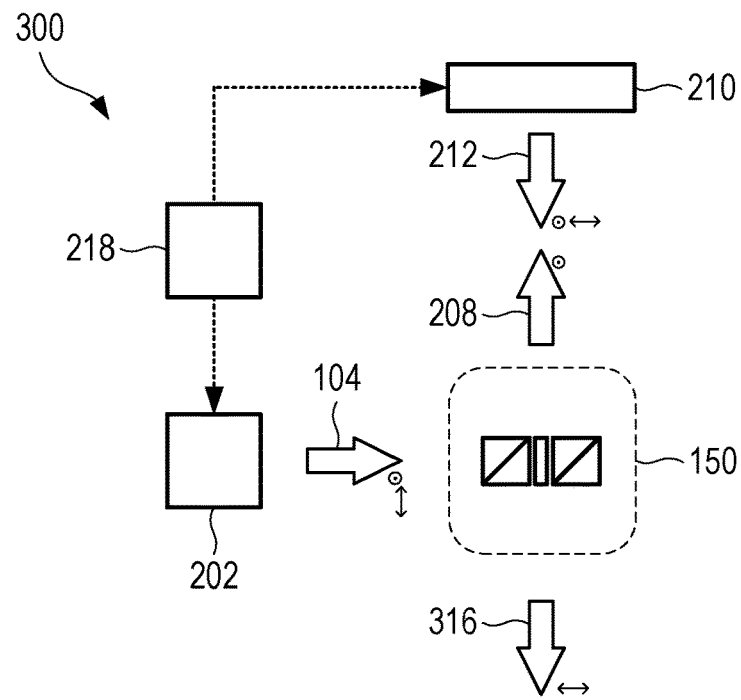
FIG. 3 shows a side view of an example of a projection display system, in accordance with some examples.

FIG. 3 shows a side view of an example of a projection display system 300, in accordance with some examples. Compared with the projection display system 200 of FIG. 2, the projection display system 200 eliminates the polarizer 214 (such as the cube beamsplitter) of FIG. 2, and instead uses the module 150 to perform the polarizing function of the polarizer 214.

The projection display system 300 can include a light source 202 that can emit an unpolarized light beam 104. In some examples, the light source 202 can include at least one light-emitting diode that can emit light, and a collimator that can collimate the light from the at least one light-emitting diode to form the unpolarized light beam 104.

The projection display system 300 can include a module of optical elements, such as module 150, that can receive the unpolarized light beam, such as 104, and can output a single exiting beam, such as 208. The module 150 can include a first polarizing beamsplitter, such as a cube beamsplitter having a polarization-sensitive coating on a hypotenuse of the cube beamsplitter. The first polarizing beamsplitter can reflect an s-polarized component of the unpolarized light beam to form a first internal beam. The first polarizing beamsplitter can transmit a p-polarized component of the unpolarized light beam to form a second internal beam. The module 150 can include a half-wave plate that can adjust a plane of polarization of the second internal beam from p-polarization to s-polarization. The module 150 can include a second polarizing beamsplitter, such as a cube beamsplitter having a polarization-sensitive coating on a hypotenuse of the cube beamsplitter. The hypotenuses of the cube beamsplitters can be parallel. The half-wave plate can be disposed between the first cube beamsplitter and the second cube beamsplitter. The second polarizing beamsplitter can reflect the second internal beam, such that the first internal beam exits the first polarizing beamsplitter to form a first exiting beam, the second internal beam exits the half-wave plate and the second polarizing beamsplitter to form a second exiting beam, the first exiting beam and the second exiting beam are adjacent, are parallel, and are s-polarized, the first exiting beam and the second exiting beam form an unmodulated beam 208.

The projection display system 300 can include a polarization-modulating panel 210 that includes an array of pixels. Each pixel can modulate a polarization state of a corresponding portion of the unmodulated beam 208 to form a polarization-modulated beam 212 in reflection from the polarization-modulating panel 210.

The first polarizing beamsplitter and the second polarizing beamsplitter can transmit a p-polarized component of the polarization-modulated beam 212 to convert the polarization-modulated beam to an intensity-modulated beam 316.

In some examples, the first exiting beam can be centered around a first beam center and has a first beam diameter. In some examples, the second exiting beam is centered around a second beam center and has a second beam diameter. In some examples, the first beam diameter can be between 98% and 102% of the second beam diameter. In some examples, the first beam center and the second beam center can be separated by a value between 98% and 102% of the second beam diameter. Other suitable values can also be used.

Figure 4:
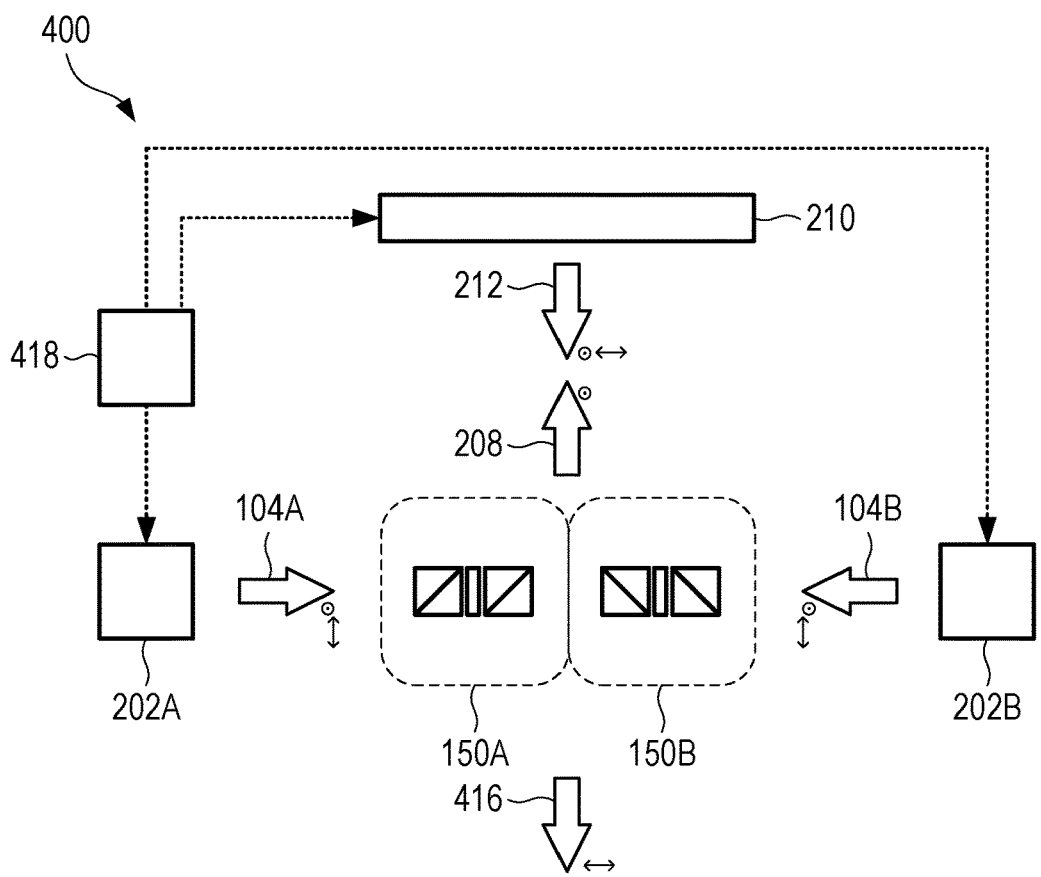
FIG. 4 shows a side view of an example of a projection display system, in accordance with some examples.

FIG. 4 shows a side view of an example of a projection display system 400, in accordance with some examples. Compared with the projection display system 300 of FIG. 3, the projection display system 400 combines light from multiple light sources 202A, 202B and multiple modules 150A, 150B to form the unmodulated beam 208, and uses the multiple modules 150A, 150B to convert the polarization-modulated beam 212 to the intensity-modulated beam 416. In some examples, a single controller 418 can control the multiple light sources 202A, 202B and the polarization-modulating panel 210. In some examples, the cube beamsplitters of the module 150A can be attached to or form integrally with the cube beamsplitters of the module 150B. Such a configuration can optionally provide an elongated unmodulated beam 208, such as having an aspect ratio of about 4 to 1. Such an elongated configuration can be used for elongated displays, and other suitable displays. In some examples, the projection display system 400 can optionally include additional pairs of light sources and modules, positioned out of the plane of the page of FIG. 4, and positioned to direct light toward the polarization-modulating panel 210.

Figure 5:
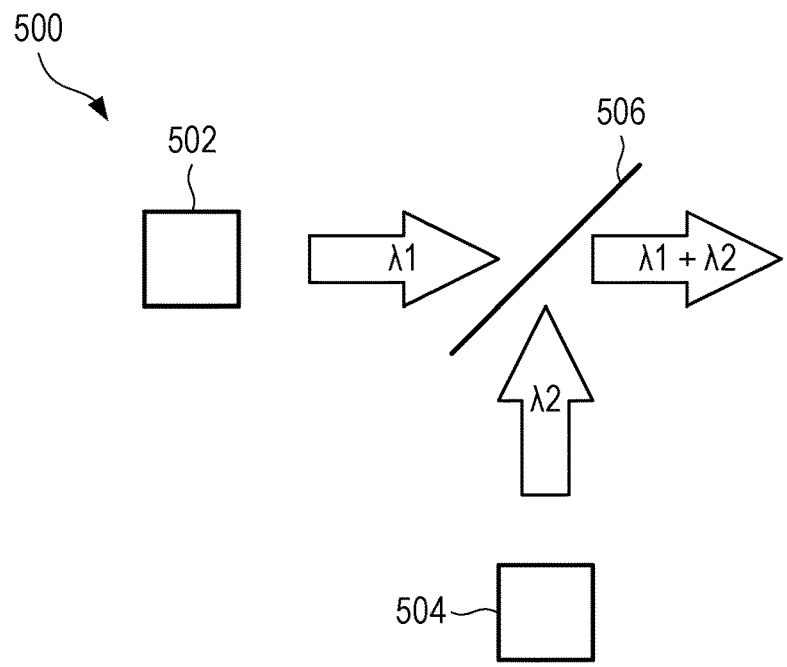
FIG. 5 shows a side view of an example of a light source, in accordance with some examples.

FIG. 5 shows a side view of an example of a light source 500, in accordance with some examples. The light source 500 can include at least one light-emitting diode 502 that can produce light having a first wavelength, such as λ1. The light source 500 can include at least one light-emitting diode 504 that can produce light having a second wavelength, such as λ2, which is different from the first wavelength. The light source 500 can include a dichroic beamsplitter 506 that can combine the light at the first and second wavelengths into a single beam. Additional light-emitting diodes at additional wavelengths can also be used with additional dichroic beamsplitters.

Figure 6:
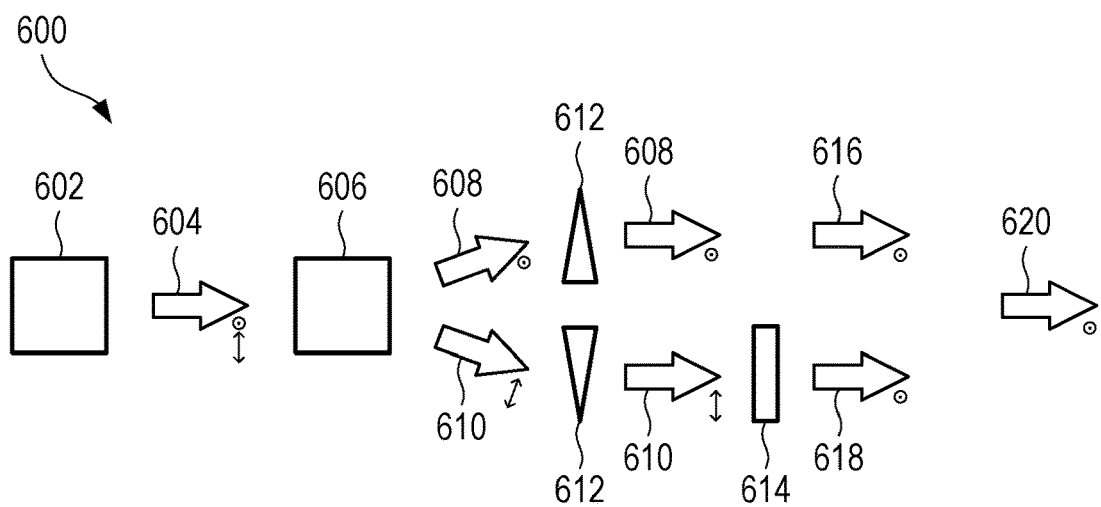
FIG. 6 shows a side view of an example of a projection display system, in accordance with some examples.

FIG. 6 shows a side view of an example of a projection display system 600, in accordance with some examples. Rather than use a cube beamsplitter with a polarization-sensitive coating on the hypotenuse, the projection display system 600 instead uses a Wollaston prism to separate the polarization components.

A light source 602 can generate an unpolarized light beam 604. The light source 602 can include at least one light-emitting diode that can emit light. The light source 602 can include a collimator that can collimate the light from the at least one light-emitting diode to form the unpolarized light beam 604.

A polarizing beamsplitter 606 can split the unpolarized light beam 604 into a first internal beam 608 and a second internal beam 610. In the configuration of FIG. 6, the polarizing beamsplitter 606 can include a Wollaston prism. The Wollaston prism can direct the first internal beam 608 and the second internal beam 610 in directions that are separated by an acute angle. The first internal beam 608 and the second internal beam 610 can have polarization states that are orthogonal.

A beam aligner 612 can change a propagation direction of at least one of the first internal beam 608 or the second internal beam 610. In the configuration of FIG. 6, the beam aligner 612 can include a prism. The prism can align, via refraction through angled surfaces of the prism, one of the first internal beam 608 or the second internal beam 610 to be parallel to the other of the first internal beam 608 or the second internal beam 610. In the configuration of FIG. 6, the beam aligner 612 can include two prisms that can align the first internal beam 608 and the second internal beam 610 to be parallel or substantially parallel.

A polarization rotator 614 can rotate a plane of polarization of at least one of the first internal beam or the second internal beam. In the configuration of FIG. 6, the polarization rotator 614 can include a half-wave plate located in the optical path of the second internal beam 610, the half-wave plate being oriented such that a fast axis of the half-wave plate is angled by 45 degrees with respect to a polarization orientation of the second internal beam 610. Alternatively, the polarization rotator 614 can include a half-wave plate located in the optical path of the first internal beam 608, the half-wave plate being oriented such that a fast axis of the half-wave plate is angled by 45 degrees with respect to a polarization orientation of the first internal beam 608.

The polarization rotator 614 and the beam aligner 612 can each adjust at least one of the first internal beam 608 or the second internal beam 610 such that the first internal beam 608 forms a first exiting beam 616 and the second internal beam 610 forms a second exiting beam 618. The first exiting beam 616 and the second exiting beam 618 can be adjacent and parallel and have parallel polarization states. The first exiting beam 616 and the second exiting beam 618 can be positioned to be directly adjacent, with respective beam edges that nearly overlap or overlap slightly. Because the first exiting beam 616 and the second exiting beam 618 can be adjacent and parallel, and can have polarization states that are parallel, the first exiting beam 616 and the second exiting beam 618 can form a single exiting beam 620. The single exiting beam 620 can illuminate a display panel, as described above.

Figure 7:
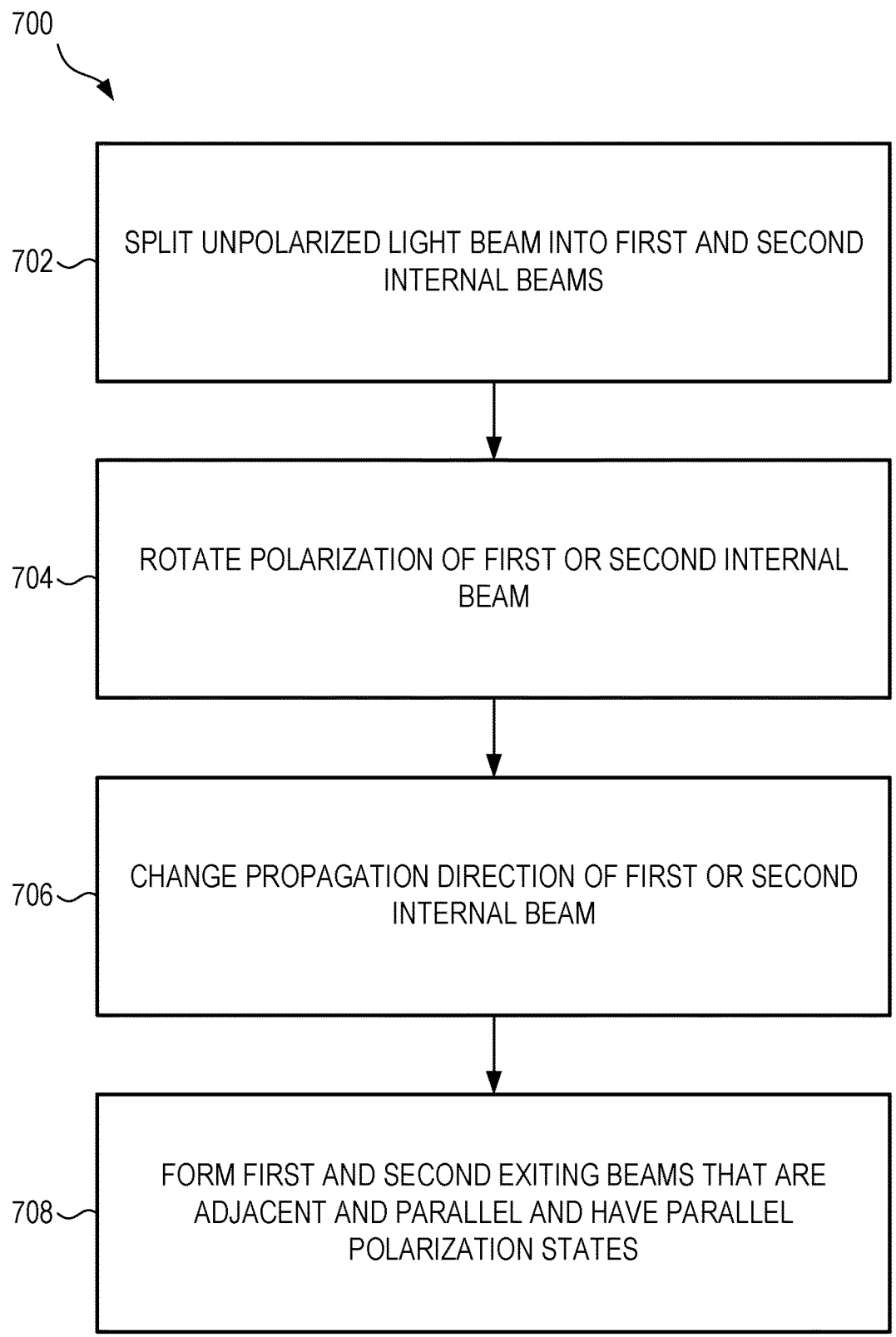
FIG. 7 shows a flow chart of an example of a method for operating a projection display system, in accordance with some examples.

FIG. 7 shows a flow chart of an example of a method 700 for operating a projection display system, in accordance with some examples. The method 700 can be executed by the projection display systems 100, 200, 300, 400, 600, or other suitable projection display systems. The method 700 is but one example of a method for operating a projection display system; other suitable methods can also be used.

At operation 702, the projection display system can split an unpolarized light beam into a first internal beam and a second internal beam. The first internal beam and the second internal beam can have polarization states that are orthogonal.

At operation 704, the projection display system can rotate, with a polarization rotator, a plane of polarization of at least one of the first internal beam or the second internal beam.

At operation 706, the projection display system can change, with a beam aligner, a propagation direction of at least one of the first internal beam or the second internal beam, such that, at operation 708, the first internal beam can exit the polarization rotator and the beam aligner to form a first exiting beam, the second internal beam can exit the polarization rotator and the beam aligner to form a second exiting beam, and the first exiting beam and the second exiting beam can be adjacent, can be parallel, and can have polarization states that are parallel.

While exemplary embodiments of the present disclosed subject matter have been shown and described herein, it will be obvious to those skilled in the art that such embodiments are provided by way of example only. Numerous variations, changes, and substitutions will now occur to those skilled in the art, upon reading and understanding the material provided herein, without departing from the disclosed subject matter. It should be understood that various alternatives to the embodiments of the disclosed subject matter described herein may be employed in practicing the various embodiments of the subject matter. It is intended that the following claims define the scope of the disclosed subject matter and that methods and structures within the scope of these claims and their equivalents be covered thereby.

It will thus be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

To further illustrate the systems and related methods disclosed herein, a non-limiting list of examples is provided below. Each of the following non-limiting examples can stand on its own or can be combined in any permutation or combination with any one or more of the other examples.

In Example 1, a projection display system can include: a polarizing beamsplitter configured to split an unpolarized light beam into a first internal beam and a second internal beam, the first internal beam and the second internal beam having polarization states that are orthogonal; a polarization rotator configured to rotate a plane of polarization of at least one of the first internal beam or the second internal beam; and a beam aligner configured to change a propagation direction of at least one of the first internal beam or the second internal beam, the polarization rotator and the beam aligner each being configured to adjust at least one of the first internal beam or the second internal beam such that the first internal beam forms a first exiting beam and the second internal beam forms a second exiting beam, the first exiting beam and the second exiting beam being adjacent and parallel and having parallel polarization states.

In Example 2, the projection display system of Example 1 can optionally be configured such that: the first exiting beam is centered around a first beam center and has a first beam diameter; the second exiting beam is centered around a second beam center and has a second beam diameter; the first beam diameter is between 90% and 110% of the second beam diameter; and the first beam center and the second beam center are separated by a value between 90% and 110% of the second beam diameter.

In Example 3, the projection display system of any one of Examples 1-2 can optionally be configured such that: the first exiting beam is centered around a first beam center and has a first beam diameter; the second exiting beam is centered around a second beam center and has a second beam diameter; the first beam diameter is between 95% and 105% of the second beam diameter; and the first beam center and the second beam center are separated by a value between 95% and 105% of the second beam diameter.

In Example 4, the projection display system of any one of Examples 1-3 can optionally be configured such that: the first exiting beam is centered around a first beam center and has a first beam diameter; the second exiting beam is centered around a second beam center and has a second beam diameter; the first beam diameter is between 98% and 102% of the second beam diameter; and the first beam center and the second beam center are separated by a value between 98% and 102% of the second beam diameter.

In Example 5, the projection display system of any one of Examples 1-3 can optionally further include: at least one light-emitting diode configured to emit light; and a collimator configured to collimate the light from the at least one light-emitting diode to form the unpolarized light beam.

In Example 6, the projection display system of any one of Examples 1-5 can optionally be configured such that: the first exiting beam and the second exiting beam form an unmodulated beam, and the system further comprises: a polarization-modulating panel including an array of pixels, each pixel configured to modulate a polarization state of a corresponding portion of the unmodulated beam to form a polarization-modulated beam; and a polarizer configured to convert the polarization-modulated beam to an intensity-modulated beam.

In Example 7, the projection display system of any one of Examples 1-6 can optionally further include: a light source configured to generate the unpolarized light beam; and a controller configured to electrically power the light source and supply a video signal to the polarization-modulating panel.

In Example 8, the projection display system of any one of Examples 1-7 can optionally be configured such that the polarizing beamsplitter comprises a cube beamsplitter having a beamsplitting coating on a hypotenuse of the cube beamsplitter, the cube beamsplitter being configured to direct the first internal beam and the second internal beam in directions that are orthogonal.

In Example 69 the projection display system of any one of Examples 1-8 can optionally be configured such that the beam aligner comprises a mirror configured to reflect one of the first internal beam or the second internal beam to be parallel to the other of the first internal beam or the second internal beam.

In Example 10, the projection display system of any one of Examples 1-9 can optionally be configured such that: the cube beamsplitter is a first cube beamsplitter; and the mirror comprises a hypotenuse of a second cube beamsplitter located adjacent to the first cube beamsplitter.

In Example 11, the projection display system of any one of Examples 1-10 can optionally be configured such that the polarizing beamsplitter comprises a Wollaston prism, the Wollaston prism being configured to direct the first internal beam and the second internal beam in directions that are separated by an acute angle.

In Example 12, the projection display system of any one of Examples 1-11 can optionally be configured such that the beam aligner comprises a prism configured to align, via refraction through angled surfaces of the prism, one of the first internal beam or the second internal beam to be parallel to the other of the first internal beam or the second internal beam.

In Example 13, the projection display system of any one of Examples 1-12 can optionally be configured such that the polarization rotator comprises a half-wave plate located in an optical path of the first internal beam, the half-wave plate being oriented such that a fast axis of the half-wave plate is angled by 45 degrees with respect to a polarization orientation of the first internal beam.

In Example 14, the projection display system of any one of Examples 1-13 can optionally be configured such that the polarization rotator comprises a half-wave plate located in an optical path of the second internal beam, the half-wave plate being oriented such that a fast axis of the half-wave plate is angled by 45 degrees with respect to a polarization orientation of the second internal beam.

In Example 15, a method for operating a projection display system can include: splitting an unpolarized light beam into a first internal beam and a second internal beam, the first internal beam and the second internal beam having polarization states that are orthogonal; rotating, with a polarization rotator, a plane of polarization of at least one of the first internal beam or the second internal beam; and changing, with a beam aligner, a propagation direction of at least one of the first internal beam or the second internal beam, the polarization rotator and the beam aligner each adjusting at least one of the first internal beam or the second internal beam such that the first internal beam forms a first exiting beam and the second internal beam forms a second exiting beam, the first exiting beam and the second exiting beam being adjacent and parallel and having parallel polarization states.

In Example 16, the method of Example 15 can optionally be configured such that: the first exiting beam is centered around a first beam center and has a first beam diameter; the second exiting beam is centered around a second beam center and has a second beam diameter; the first beam diameter is between 90% and 110% of the second beam diameter; and the first beam center and the second beam center are separated by a value between 90% and 110% of the second beam diameter.

In Example 17, the method of any one of Example 15-16 can optionally be configured such that: the first exiting beam is centered around a first beam center and has a first beam diameter; the second exiting beam is centered around a second beam center and has a second beam diameter; the first beam diameter is between 98% and 102% of the second beam diameter; and the first beam center and the second beam center are separated by a value between 98% and 102% of the second beam diameter.

In Example 18, a projection display system can include: a light source configured to emit an unpolarized light beam; a first polarizing beamsplitter configured to reflect an s-polarized component of the unpolarized light beam to form a first internal beam, and transmit a p-polarized component of the unpolarized light beam to form a second internal beam; a half-wave plate configured to adjust a plane of polarization of the second internal beam from p-polarization to s-polarization; a second polarizing beamsplitter configured to reflect the second internal beam, such that: the first internal beam exits the first polarizing beamsplitter to form a first exiting beam; the second internal beam exits the half-wave plate and the second polarizing beamsplitter to form a second exiting beam; the first exiting beam and the second exiting beam are adjacent and parallel and s-polarized; and the first exiting beam and the second exiting beam form an unmodulated beam; and a polarization-modulating panel including an array of pixels, each pixel configured to modulate a polarization state of a corresponding portion of the unmodulated beam to form a polarization-modulated beam in reflection from the polarization-modulating panel, the first polarizing beamsplitter and the second polarizing beamsplitter being further configured to transmit a p-polarized component of the polarization-modulated beam to convert the polarization-modulated beam to an intensity-modulated beam.

In Example 19, the projection display of Example 18 can optionally be configured such that: the first polarizing beamsplitter includes a first polarization-sensitive coating disposed on a first hypotenuse of a first cube beamsplitter; the second polarizing beamsplitter includes a second polarization-sensitive coating disposed on a second hypotenuse of a second cube beamsplitter; the first hypotenuse is parallel to the second hypotenuse; and the half-wave plate is disposed between the first cube beamsplitter and the second cube beamsplitter.

In Example 20, the projection display system of any one of Examples 18-19 can optionally be configured such that: the first exiting beam is centered around a first beam center and has a first beam diameter; the second exiting beam is centered around a second beam center and has a second beam diameter; the first beam diameter is between 98% and 102% of the second beam diameter; and the first beam center and the second beam center are separated by a value between 98% and 102% of the second beam diameter.

What is claimed is:

1. A projection display system, comprising:
a polarizing beamsplitter configured to split an unpolarized light beam into a first internal beam and a second internal beam, the first internal beam and the second internal beam having polarization states that are orthogonal;
a polarization rotator configured to rotate a plane of polarization of at least one of the first internal beam or the second internal beam; and
a beam aligner configured to change a propagation direction of at least one of the first internal beam or the second internal beam, the polarization rotator and the beam aligner each being configured to adjust at least one of the first internal beam or the second internal beam such that the first internal beam forms a first exiting beam and the second internal beam forms a second exiting beam,
the first exiting beam and the second exiting beam being adjacent and parallel and having parallel polarization states,
the first exiting beam being centered around a first beam center and having a first beam diameter,
the second exiting beam being centered around a second beam center and having a second beam diameter,
the first beam diameter being between 95% and 105% of the second beam diameter,
the first beam center and the second beam center being separated by a value between 95% and 105% of the second beam diameter.

2. The projection display system of claim 1, wherein:
the first exiting beam is centered around a first beam center and has a first beam diameter;
the second exiting beam is centered around a second beam center and has a second beam diameter;
the first beam diameter is between 98% and 102% of the second beam diameter; and
the first beam center and the second beam center are separated by a value between 98% and 102% of the second beam diameter.

3. The projection display system of claim 1, further comprising:
at least one light-emitting diode configured to emit light; and
a collimator configured to collimate the light from the at least one light-emitting diode to form the unpolarized light beam.

4. The projection display system of claim 1, wherein:
the first exiting beam and the second exiting beam form an unmodulated beam, and
the system further comprises:
a polarization-modulating panel including an array of pixels, each pixel configured to modulate a polarization state of a corresponding portion of the unmodulated beam to form a polarization-modulated beam; and
a polarizer configured to convert the polarization-modulated beam to an intensity-modulated beam.

5. The projection display system of claim 4, further comprising:
a light source configured to generate the unpolarized light beam; and
a controller configured to electrically power the light source and supply a video signal to the polarization-modulating panel.

6. The projection display system of claim 1, wherein the polarizing beamsplitter comprises a cube beamsplitter having a beamsplitting coating on a hypotenuse of the cube beamsplitter, the cube beamsplitter being configured to direct the first internal beam and the second internal beam in directions that are orthogonal.

7. The projection display system of claim 6, wherein the beam aligner comprises a mirror configured to reflect one of the first internal beam or the second internal beam to be parallel to the other of the first internal beam or the second internal beam.

8. The projection display system of claim 7, wherein:
the cube beamsplitter is a first cube beamsplitter; and
the mirror comprises a hypotenuse of a second cube beamsplitter located adjacent to the first cube beamsplitter.

9. The projection display system of claim 1, wherein the polarizing beamsplitter comprises a Wollaston prism, the Wollaston prism being configured to direct the first internal beam and the second internal beam in directions that are separated by an acute angle.

10. The projection display system of claim 9, wherein the beam aligner comprises a prism configured to align, via refraction through angled surfaces of the prism, one of the first internal beam or the second internal beam to be parallel to the other of the first internal beam or the second internal beam.

11. The projection display system of claim 1, wherein the polarization rotator comprises a half-wave plate located in an optical path of the first internal beam, the half-wave plate being oriented such that a fast axis of the half-wave plate is angled by 45 degrees with respect to a polarization orientation of the first internal beam.

12. The projection display system of claim 1, wherein the polarization rotator comprises a half-wave plate located in an optical path of the second internal beam, the half-wave plate being oriented such that a fast axis of the half-wave plate is angled by 45 degrees with respect to a polarization orientation of the second internal beam.

13. A method for operating a projection display system, the method comprising:
splitting an unpolarized light beam into a first internal beam and a second internal beam, the first internal beam and the second internal beam having polarization states that are orthogonal;
rotating, with a polarization rotator, a plane of polarization of at least one of the first internal beam or the second internal beam; and
changing, with a beam aligner, a propagation direction of at least one of the first internal beam or the second internal beam, the polarization rotator and the beam aligner each adjusting at least one of the first internal beam or the second internal beam such that the first internal beam forms a first exiting beam and the second internal beam forms a second exiting beam,
the first exiting beam and the second exiting beam being adjacent and parallel and having parallel polarization states,
the first exiting beam being centered around a first beam center and having a first beam diameter,
the second exiting beam being centered around a second beam center and having a second beam diameter,
the first beam diameter being between 95% and 105% of the second beam diameter,
the first beam center and the second beam center being separated by a value between 95% and 105% of the second beam diameter.

14. The method of claim 13, wherein:
the first exiting beam is centered around a first beam center and has a first beam diameter;
the second exiting beam is centered around a second beam center and has a second beam diameter;

the first beam diameter is between 98% and 102% of the second beam diameter; and the first beam center and the second beam center are separated by a value between 98% and 102% of the second beam diameter.

15. A projection display system, comprising:

a light source configured to emit an unpolarized light beam;

a first polarizing beamsplitter configured to reflect an s-polarized component of the unpolarized light beam to form a first internal beam, and transmit a p-polarized component of the unpolarized light beam to form a second internal beam;

a half-wave plate configured to adjust a plane of polarization of the second internal beam from p-polarization to s-polarization;

a second polarizing beamsplitter configured to reflect the second internal beam, such that:

the first internal beam exits the first polarizing beamsplitter to form a first exiting beam;

the second internal beam exits the half-wave plate and the second polarizing beamsplitter to form a second exiting beam;

the first exiting beam and the second exiting beam are adjacent and parallel and s-polarized; and the first exiting beam and the second exiting beam form an unmodulated beam; and a polarization-modulating panel including an array of pixels, each pixel configured to modulate a polarization state of a corresponding portion of the unmodulated beam to form a polarization-modulated beam in reflection from the polarization-modulating panel, the first polarizing beamsplitter and the second polarizing beamsplitter being further configured to transmit a p-polarized component of the polarization-modulated beam to convert the polarization-modulated beam to an intensity-modulated beam.

16. The projection display system of claim 15, wherein:

the first polarizing beamsplitter includes a first polarization-sensitive coating disposed on a first hypotenuse of a first cube beamsplitter;

the second polarizing beamsplitter includes a second polarization-sensitive coating disposed on a second hypotenuse of a second cube beamsplitter;

the first hypotenuse is parallel to the second hypotenuse; and the half-wave plate is disposed between the first cube beamsplitter and the second cube beamsplitter.

17. The projection display system of claim 15, wherein:

the first exiting beam is centered around a first beam center and has a first beam diameter;

the second exiting beam is centered around a second beam center and has a second beam diameter;

the first beam diameter is between 98% and 102% of the second beam diameter; and the first beam center and the second beam center are separated by a value between 98% and 102% of the second beam diameter.

* * * * *